United States Patent
Steinbuch et al.

(10) Patent No.: US 7,084,807 B2
(45) Date of Patent: Aug. 1, 2006

(54) METHOD AND APPARATUS FOR GENERATING HF SIGNALS FOR DETERMINING A DISTANCE AND/OR A SPEED OF AN OBJECT

(75) Inventors: Dirk Steinbuch, Wimsheim (DE); Martin Reiche, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 10/491,089

(22) PCT Filed: Apr. 2, 2003

(86) PCT No.: PCT/DE03/01077

§ 371 (c)(1),
(2), (4) Date: Mar. 29, 2004

(87) PCT Pub. No.: WO03/107032

PCT Pub. Date: Dec. 24, 2003

(65) Prior Publication Data

US 2004/0239555 A1   Dec. 2, 2004

(30) Foreign Application Priority Data

Jun. 14, 2002  (DE) .............................. 102 26 575

(51) Int. Cl.
*G01S 13/93* (2006.01)

(52) U.S. Cl. .................... 342/70; 342/109; 342/134; 342/71; 342/72

(58) Field of Classification Search ............ 342/70–72, 342/109, 134
See application file for complete search history.

(56) References Cited

U.S. PATENT DOCUMENTS

| | | | | |
|---|---|---|---|---|
| 3,858,208 | A * | 12/1974 | Parke et al. | 342/88 |
| 4,057,800 | A * | 11/1977 | Ganz | 342/116 |
| 4,103,302 | A * | 7/1978 | Roeder et al. | 342/113 |
| 4,443,799 | A * | 4/1984 | Rubin | 342/201 |
| 4,529,985 | A | 7/1985 | Sawyer et al. | 342/162 |
| 4,707,697 | A | 11/1987 | Coulter et al. | 342/25 A |
| 5,389,931 | A * | 2/1995 | Anderson et al. | 342/70 |
| 5,990,824 | A * | 11/1999 | Harrison | 342/160 |

(Continued)

OTHER PUBLICATIONS

"Doppler-tolerant signal waveforms", Rihaczek, A.W. Proceedings of the IEEE vol. 54, Issue 6, Jun. 1966 pp.: 849-857.*

*Primary Examiner*—John B. Sotomayor
(74) *Attorney, Agent, or Firm*—Michael J. Striker

(57) ABSTRACT

The present invention provides a method for generating HF signals for determining a distance and/or a speed of an object, having the following steps: generating a pulsed demodulated signal (6') from a first signal (3) and a second signal (4) in a signal generator (31; 1, 2, M1, 7, 8); with a transmitting device (20), sending the pulsed modulated signal (6') in the direction of an object (40); with a receiving device (21), receiving a pulsed signal (6") reflected by the object (40); generating a pulsed demodulated signal (4") from the received signal (6") and the first signal (3) in a first signal processor (32; M2, 15); and generating a coherent signal (23) from the pulsed demodulated signal (4") and the second signal (4) and a noncoherent signal (22) from the pulsed demodulated signal (4") in a second signal processor (33; M3, 16, 17, 18). The present invention also provides an apparatus for generating HF signals for determining a distance and/or a speed of an object.

29 Claims, 2 Drawing Sheets

U.S. PATENT DOCUMENTS

Figure 1:
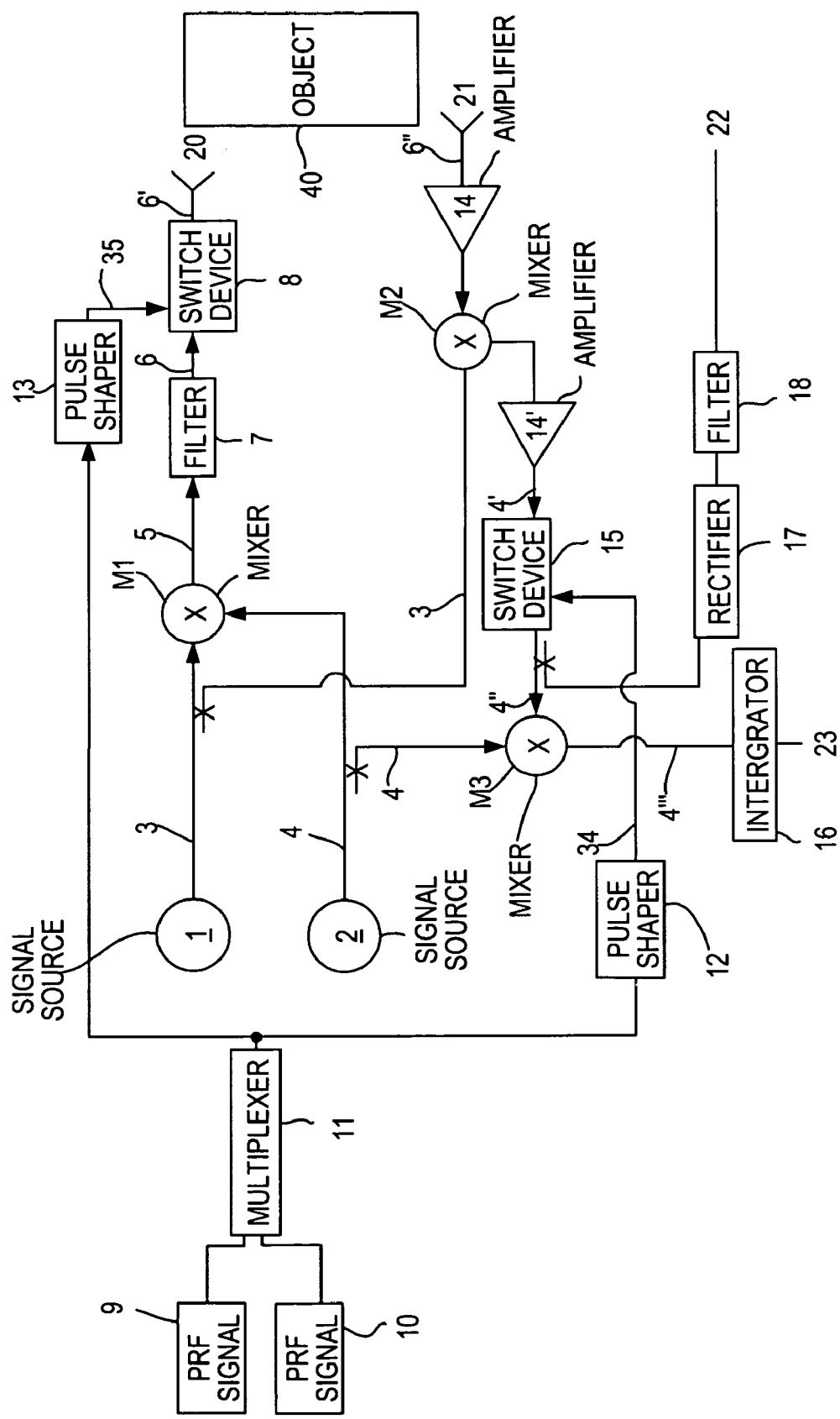

| | | | |
|---|---|---|---|
| 6,211,815 B1 | 4/2001 | Richey et al. | 342/194 |
| 6,335,701 B1 * | 1/2002 | Fujisaka et al. | 342/115 |
| 6,646,587 B1 * | 11/2003 | Funai | 342/26 R |
| 6,930,631 B1 * | 8/2005 | Puglia | 342/70 |

* cited by examiner

METHOD AND APPARATUS FOR GENERATING HF SIGNALS FOR DETERMINING A DISTANCE AND/OR A SPEED OF AN OBJECT

PRIOR ART

The present invention relates to a method and an apparatus for generating HF signals for determining a distance and/or a speed of an object.

Systems for measuring the distance and speed of static objects or objects in motion using high frequency (radar) are becoming more and more important, especially in the automotive industry. Detecting objects by radar is already used today for parking aids and speed governing systems with distance measurement for great distances, such as the following distances on limited-access highways. Additional areas where such systems can be used are monitoring the so-called blind spot of a vehicle, pre-crash detection for the sake of controlled actuation of airbags and belt tighteners, so-called backing aids, and also speed governing systems, which because of the higher resolution of the system make operation possible even at lesser distances, as in travel between cities or in city traffic.

One known system is the radar front end system known as SRR (for short range radar), which operates at a frequency of 24.125 GHz and makes it possible to determine distance by transmitting HF pulses with a typical width of 400 ps and determining their transit time.

Given the restrictions to permission for radiation emissions in the United States and in future in Europe as well, there is a need to reduce the transmission power of such systems, but doing so limits the range of such a system. A predetermined range must absolutely be maintained, however, to assure safe operation, for instance in this kind of distance-measuring radar for a speed governing system.

ADVANTAGES OF THE INVENTION

The method and apparatus according to the invention for generating HF signals for determining a distance and/or a speed of an object, having the characteristics of claims 1 and 18, respectively, have the advantage over the known embodiments that a better noise factor and hence an increased detection distance can be achieved, so as to compensate for a possible necessary reduction in power; that is, even if the transmission power is reduced, all the necessary functions can be performed, especially while keeping system and sensor costs unchanged.

The concept on which the present invention is based is to apply a superheterodyne concept, taking necessary modifications into account, to the architecture of the known SRR (short range radar).

In the present invention, the problem addressed at the outset is solved in particular by providing that a pulsed modulated signal is generated in a signal generator from a first signal and a second signal and is broadcast via a transmitting device, while via a receiving device a pulsed signal reflected by an object is received, and from that a pulsed demodulated signal is generated with the aid of the first signal in a first signal processor, and a coherent signal is generated from this pulsed demodulated signal with the aid of the second signal, and a noncoherent signal is generated from the pulsed demodulated signal in a second signal processor.

Advantageous refinements and improvements of the method defined by claim 1 and the apparatus defined by claim 18 are recited in the dependent claims.

In a preferred refinement, in the signal generator, the first signal is generated with a first HF oscillator and the second signal is generated with a second HF oscillator, and these signals are modulated in a modulator into a modulated signal pair. This has the advantage that the modulation of the second signal (coherence oscillator signal or coho) to the first signal (HF oscillator stalo) can be done in narrow-band fashion by the modulator upstream of an HF switch device. Another advantage is that the modulator can in principle be embodied in unbalanced form and consequently can be based on a single diode.

In a further preferred refinement, the modulated signal pair is converted in a filter device, in particular a high-pass filter, into a filtered modulated signal and, by a first switch device, into a pulsed modulated signal. This has the advantage that the unwanted lower sideband created by the modulation can be suppressed by filtering, for instance using an etched stripline filter on the HF substrate or using an integrated filter for the sake of saving space. If the first modulator comprises one diode (unbalanced up-converter), then in the resultant mixed product a considerable residual carrier remains at 24 GHz. This carrier must also be suppressed by the high-pass filter. If a balanced mixer is used, then the residual carrier, as a mixed product, is largely avoided.

In a further preferred refinement, the first signal processor converts the received signal into a demodulated signal with the aid of the first signal in a second modulator and into a pulsed demodulated signal by means of a second switch device. This makes it possible to utilize the amplitude information of the transmission signal, not by means of a switch device in the HF branch as in SRR, but instead by means of a switch device after the first demodulation. The switch at the low frequency is more economical to make. The sampling of the low-frequency signal is done at a higher signal level, for instance after low-frequency preamplification.

In a further preferred refinement, the pulsed demodulated signal is converted into the noncoherent envelope curve signal by means of a rectifier and a filter device, in particular a low-pass filter. This has the advantage that by this envelope curve detection, in which the phase information is lost because of the noncoherent demodulation by the rectifier, in contrast to SRR no zero crossovers are generated, and it is therefore possible to dispense with complicated I/Q demodulation in the second modulator.

In a further preferred refinement, the pulsed demodulated signal is demodulated in a third modulator with the aid of the second signal to form a twice-demodulated pulsed signal. The advantage of this step is that thus the pulsed demodulated signal, which contains the distance information, is subsequently demodulated with the second signal in the third modulator, and after evaluation, the speed determination can be done using the Doppler effect. Because of the coherent demodulation, the phase information is preserved.

In a further preferred refinement, the pulsed, twice-modulated signal is delivered to an integrator, which integrates the signal to form the coherent signal. This makes it possible to evaluate the coherent signal and consequently to measure the speed by way of the Doppler effect.

In a further preferred refinement, pulse signals for activating the switch devices are generated in a pulse generator. As a result, precise triggering of the first and second switch devices is made possible.

In a further preferred refinement, a clock signal that is alternatingly shifted slightly externally and internally by a fixed mean value of a predetermined period length is combined in a multiplexer of the pulse generator, and via pulse shapers, activation signals of the switch devices are generated. As a result, an advantageous non-equidistant pulse pattern of the transmitted HF signal is made possible.

In a further preferred refinement, the frequency of the first signal is approximately 21.5 GHz, and the frequency of the second signal is approximately 2.5 GHz. This has the advantage that the resultant transmission frequency (in this case, 24 GHz) is in the ISM band around 24.125 GHz, which is necessary since residual broadcasting of this carrier is unavoidable and must occur in an approved band.

In a further preferred refinement, the frequency of the first signal is approximately 24 GHz, and the frequency of the second signal is approximately 3.5 GHz. This has the advantage that the resultant transmission frequency of 25 GHz to 27.5 GHz is designed for a desired transmission outside prohibited bands, to avoid permit problems.

In a further preferred refinement, the signal received from the receiving device is amplified in a low-noise amplifier before it is delivered to the first signal processor. This makes a further reduction of the noise factor of the entire radar system by a further 6 dB possible.

In a further preferred refinement, the demodulated signal is amplified downstream of the second modulator in an amplifier, in particular a low-frequency preamplifier, before it is delivered to the second switch device. As a result, the signal level is advantageously raised.

DRAWINGS

Exemplary embodiments of the invention are shown in the drawings and described in further detail in the ensuing description.

Figure 2:
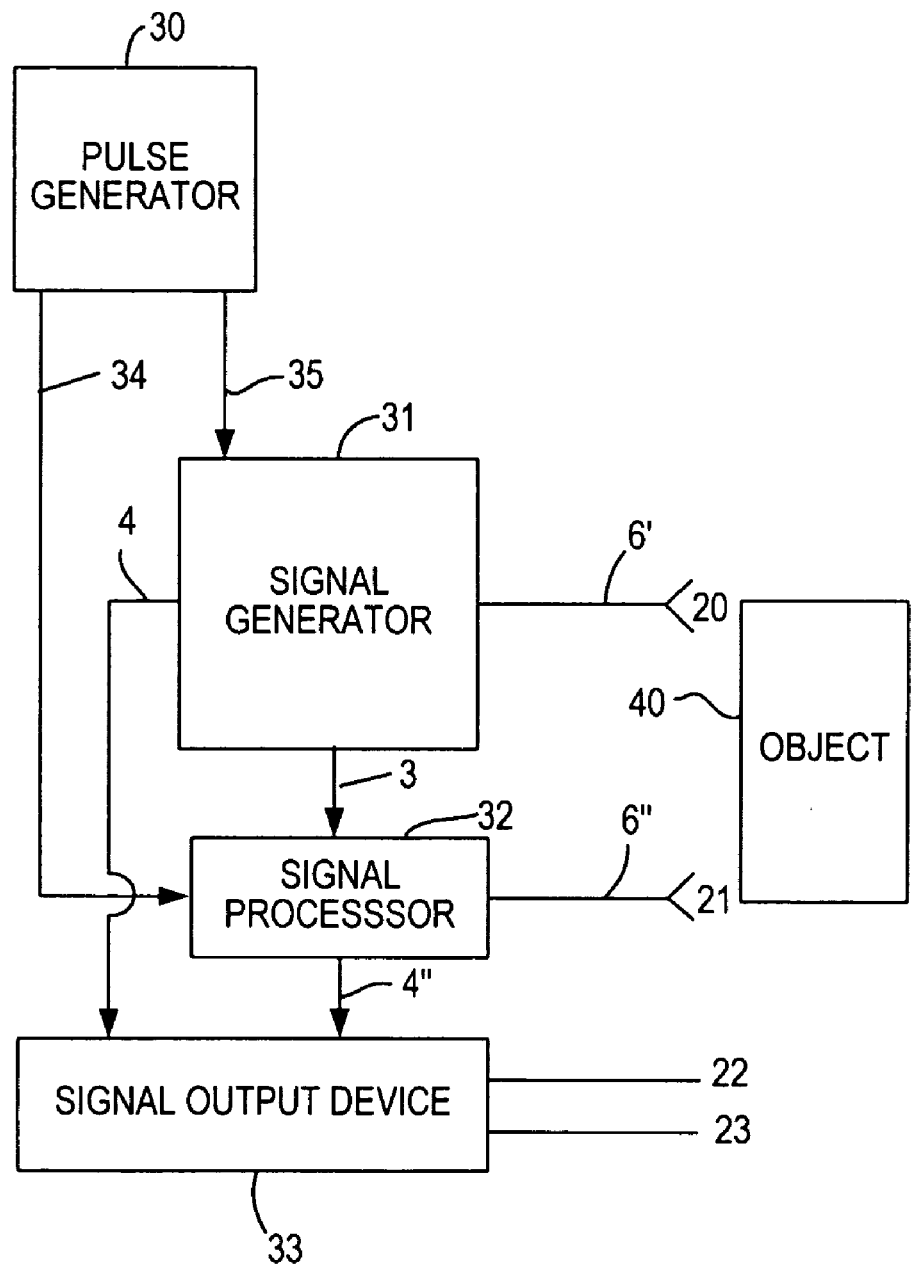

Shown are:

FIG. 1, a schematic illustration of an apparatus, for explaining the mode of operation of a first embodiment of the present invention;

FIG. 2, a block diagram, for schematically illustrating an apparatus in a second embodiment of the present invention; and

DESCRIPTION OF THE EXEMPLARY EMBODIMENTS

In the drawings, the same reference numerals stand for the same or functionally identical components.

FIG. 1 is a schematic illustration of an apparatus for explaining the mode of operation of a first embodiment of the present invention.

In FIG. 1, a pulse-based superheterodyne radar system, particularly for short range, is shown. In a first signal source 1, a first high-frequency signal 3 (stalo) of the frequency $f_{ST}$ is generated. In a second signal source 2, a second high-frequency signal 4 (coho) of the frequency $f_{LF}$ is generated. In a first modulator M1, which is based for instance essentially on a single diode and is embodied in unbalanced form, the second signal 4 is modulated to the first signal 3. The modulation essentially corresponds to multiplication in the time range, or in other words addition in the frequency range, resulting in a modulated signal pair 5 that has the frequencies $f_{ST} \pm f_{LF}$.

The unwanted lower sideband $f_{ST}-f_{LF}$ of the modulated signal pair 5 and also the residual carrier $f_{ST}$ are suppressed in a filter device 7, for instance an etched stripline filter on the HF substrate or an integrated filter (to save space), so that a filtered modulated signal 6 of the frequency $f_{ST}+f_{LF}$ is carried onward to a first switch device 8.

A PRF (pulse repeated frequency) signal 9, permanently slightly shifted externally with respect to a predetermined mean value of a period length, is combined with a PRF (pulse repeated frequency) signal 10, internally slightly shifted, in a multiplexer 11. The result is a constantly slightly varied repetition rate, for instance in the range between 350 and 450 ns, so as to avoid equidistant activation signals 34, 35 that are generated by a pulse shaper 12 on the receiver side and a pulse shaper 13 on the transmitter side.

The external PRF signal 9 preferably originates in a cross echo partner (not shown). The detection range for cross echo measurement is located symmetrically relative to the semi-axis at the distance between the transmitter and the receiver. The PRF signal 9 is delivered to the receiver via an internal delay 12. A possible carrier frequency offset of the transmitter and receiver, caused for instance by tolerances or aging, is slight in comparison to the bandwidth of the low-frequency channel. It is therefore possible for even a frequency-offset signal in the noncoherent reception path to be undergo envelope curve demodulation.

In indirect triangulation or in the cross echo method, a first sensor transmits a signal at a first carrier frequency, and at least one second, laterally spaced-apart sensor, for instance at a distance of 1 m, receives the first signal reflected by an object. The second sensor can be designed for a slightly different carrier frequency, as long as the frequency difference does not exceed the bandwidth of the low-frequency channel. A centric directional characteristic is made possible by the at least two sensors laterally spaced apart from one another.

The pulse shapers 12, 13 define the pulse duration, such as 400 ps or 1 ns, at which the first switch device 8, or a second switch device 15, is activated. The ON time of the first switch device 8 is controlled by means of the activation signal 35, so that from the filtered modulated signal 6, a pulsed modulated signal 6' is created, which is broadcast via a transmitting device 20, such as an antenna.

The pulsed modulated signal 6' broadcast via the antenna 20 is reflected at an object 40 and received by a receiving device 21. A signal 6" received by the receiving device 21 passes through a low-noise amplifier 14 and is delivered to a second modulator M2. The second modulator M2 demodulates the received signal 6" using the first signal 3, and the mixer M2 outputs a demodulated signal of the frequency $f_{LF}$.

This demodulated signal 4' is delivered to a second switch device 15, which as a function of the activation signal 34 generates a pulsed demodulated signal 4" at the frequency $f_{LF}$. The demodulated signal 4' can be delivered, upstream of the second switch device 15, to an amplifier device (14'), such as a low frequency preamplifier, in order to raise the signal level. In a third modulator M3, the pulsed demodulated signal 4" is demodulated with the second signal 4 of the second HF oscillator (coho), that is, the coherence oscillator, so that a twice-demodulated pulsed signal 4''', that is, a basic pulse train where f=0, is created.

Since the pulsed demodulated signal 4" contains the desired distance information for the distance between the apparatus and the object 40, the signal 4''' demodulated with the coherent signal 4, after evaluation of the signal 4''' in an integrator 16, makes it possible to determine the speed on the basis of the Doppler effect, using the coherent signal 23. Parallel to this, by means of a rectifier 17, the pulsed demodulated signal 4" is subjected to a noncoherent demodulation, with a loss of the phase information. This envelope curve detection, however, does not generate any zero crossovers, since there is no phase dependency, and therefore it is possible to dispense with a complicated I/Q modulation (in-phase quadrature demodulation) in the mixer M2. The rectifier 17 is followed by a filter device 18, such as a low-pass filter, at the output of which a noncoherent signal 22, for instance for determining the distance, is output by the cross echo method and static targets.

The choice of the frequency $f_{LF}$ of the second signal, such as 2.5 GHz, is determined on the one hand from the requirements for a feasible HF filter, which are not as hard to meet at a higher frequency $f_{LF}$, and the requirements for the noncoherent envelope curve demodulation of the pulsed demodulated signal 4". The cut-off frequency of the downstream low-pass filter advantageously makes a precise distinction between the boundaries of the baseband (rectified signal around 0 Hz) and the frequency $f_{LF}$ at 2.5 Ghz. The result is a useful limit frequency, in this example, of 1.25 GHz.

In principle, the bandwidth of the frequency $f_{LF}$ must encompass the double-sided HF pulse spectrum. At an HF pulse width of 500 ps, the 10 dB bandwidth is at 2.4 GHz, and the 20 dB bandwidth is at 3.4 GHz, assuming a gaussian pulse shape in the time range. In the branch for the envelope curve detection, the possible Doppler shifts of up to 10 kHz can be ignored. For reasons of cost, the mixer M3 can be embodied as a singly balanced mixer, since in determining the distance no zero points occur, and for the speed determination, an I/Q signal originating in an alternative I/Q mixer is not absolutely necessary.

The mixer M2 is designed to be singly balanced, so as to profit from the suppression of the amplitude noise of the first HF source (stalo). The low-noise amplifier can optionally be dispensed with, since because of the improvement in the noise factor of the entire radar system, the further 6 dB of this amplifier are not absolutely necessary to achieve the planned functions, and hence this cost-intensive component may optionally be omitted. The third mixer M3 can be designed in this frequency range as an economical integrated Gilbert cell mixer and can furnish the requisite amplification without further amplifier stages, or with a preamplifier 14', between the mixer M2 and the second switch device.

FIG. 2 is a block diagram for explaining a second embodiment of the present invention.

In FIG. 2, a pulse generator 30 is shown, which furnishes an activation signal 35 for a switch device in a signal generator 31 and an activation signal 34 for a switch device in a first signal evaluation device 32. A pulsed modulated signal 6' of the frequency $f_{ST}+f_{LF}$ is generated in the signal generator 31 and is delivered to a transmitting device 20, such as an antenna. In addition, the signal generator 31 outputs a signal (coho) at the frequency $f_{LF}$ to a second signal processor or signal output device 33, as well as a further signal (stalo) at the frequency $f_{ST}$ to the first signal processor 32.

The pulsed demodulated signal 6', broadcast via the transmitting device 20, strikes an object 40 and is reflected by it. The reflected signal 6" received by a receiving device 21 is delivered to the first signal processor 32. In this signal processor 32, from the received signal 6' together with the signal 3 (stalo) and the activation signal (34), a pulsed demodulated signal 4" at the frequency $f_{LF}$ is formed, which is delivered to the second signal processor 33.

From this pulsed demodulated signal 4" and the signal 4 (coho), a noncoherent signal 22 for a cross echo method and for measuring the distance from static targets is generated in the signal processor or signal output device 33. The signal processor or signal output device 33 also generates a coherent signal, from which the speed of the object 40 relative to the transmitting device 20 or receiving device 21 can be evaluated. Here, the words coherent and noncoherent refer to the signal 4 (coho), which can also be called a coherence signal, with coherence meaning the fixed phase relationship between two signals.

In the present invention, preferably two frequency pairs for the first signal of the frequency $f_{ST}$ and the second signal of the frequency $f_{LF}$ are provided. These are first a first frequency of 21.5 GHz for $f_{ST}$ (stalo) and a second frequency of 2.5 GHz for $f_{LF}$ (coho), and second, a first frequency of 24 GHz for $f_{ST}$ (stalo) and a second frequency of 2.5 GHz to 3.5 GHz $f_{LF}$ (coho).

The prerequisite for achieving this system is that the residual carrier must be less than −30 dBm, which can be achieved by means of a switch insulation of 50 dB.

Although the present invention has been described above in terms of preferred exemplary embodiments, it is not limited to them but instead can be modified in manifold ways.

For example, concrete component specifications especially, such as a diode for a mixer or a stripline grid filter for the filter device, can also be simulated using other components or devices.

The invention claimed is:

1. A method for generating HF signals for determining a distance and/or a speed of an object, having the following steps:
    generating a pulsed modulated signal (6') from a first signal (3) and a second signal (4) in a signal generator (31; 1, 2, M1, 7, 8);
    with a transmitting device (20), sending the pulsed modulated signal (6') in the direction of an object (40);
    with a receiving device (21), receiving a pulsed signal (6") reflected by the object (40);
    generating a pulsed demodulated signal (4") from the received signal (6") and the first signal (3) in a first signal processor (32; M2, 15); and
    generating a coherent signal (23) from the pulsed demodulated signal (4") and the second signal (4) and a noncoherent signal (22) from the pulsed demodulated signal (4") in a second signal processor (33; M3, 16, 17, 18).

2. The method of claim 1,
    characterized in that
    from the coherent signal (23), an approach speed of the object (40) is determined.

3. The method of claim 1,
    characterized in that
    from the noncoherent signal (22), a distance from the object (40) is determined.

4. The method of claim 1,
    characterized in that
    in the signal generator (31; 1, 2, M1, 8), the first signal (3) is generated with a first oscillator (1) and the second signal (4) is generated with a second oscillator (2), and these signals are modulated into a modulated signal pair (5) in a first modulator (M1).

5. The method of claim 4,
    characterized in that
    the modulated signal pair (5) is converted, in a filter device (7), in particular a high-pass filter, into a filtered modulated signal (6) and, by a first switch device (8), into a pulsed modulated signal (6').

6. The method of claim 1,
characterized in that
the first signal processor (32; M2, 15) converts the received signal (6") with the first signal (3) into a demodulated signal (4') in a second modulator (M2) and into a pulsed demodulated signal (4") by means of a second switch device (15).

7. The method of claim 1,
characterized in that
the pulsed demodulated signal (4") is converted into the noncoherent signal (22) by means of a rectifier (17) and a filter device (18), in particular a low-pass filter.

8. The method of claim 1,
characterized in that
the pulsed demodulated signal (4") is demodulated in a third modulator (M3) with the second signal (4) to form a twice-demodulated pulsed signal (4'").

9. The method of claim 8,
characterized in that
the pulsed, twice-modulated signal (4'") is delivered to an integrator (16), which integrates the signal to form the coherent signal (23).

10. The method of claim 1,
characterized in that
pulse signals (34, 35) for activating the switch devices (8, 15) are generated in a pulse generator (30; 10, 11, 12, 13).

11. The method of claim 10,
characterized in that
a clock signal (9, 10) that is slightly shifted externally and internally in alternation by a fixed mean value of a predetermined period length is combined in a multiplexer (11) of the pulse generator (30), and via pulse shapers (12, 13), activation signals (34, 35) of the switch devices (15, 8) are generated.

12. The method of claim 11,
characterized in that
in the pulse shapers (12, 13), pulses approximately 1 ns in length are formed.

13. The method of claim 10,
characterized in that
the clock signal (9, 10) that is slightly shifted externally and internally in alternation by a fixed mean value of a predetermined period length activates the switch devices (8, 15) every 350 ns to 450 ns.

14. The method of claim 1,
characterized in that
the frequency of the first signal (3) is approximately 21.5 GHz, and the frequency of the second signal (4) is approximately 2.5 GHz.

15. The method of claim 1,
characterized in that
the frequency of the first signal (3) is approximately 24 GHz, and the frequency of the second signal (4) is approximately 3.5 GHz.

16. The method of claim 1,
characterized in that
the signal (6") received from the receiving device (21) is amplified in a low-noise amplifier (14) before it is delivered to the first signal processor (32; M2, 15).

17. The method of claim 1,
characterized in that
the determination of the distance of an object (40) is made in a cross echo method or by indirect triangulation with a cross echo partner.

18. An apparatus for generating HF signals for determining a distance and/or a speed of an object, having:

a signal generator (31; 1, 2, M1, 7, 8), for generating a pulsed modulated signal (6') from a first signal (3) and a second signal (4);
a transmitting device (20), for transmitting the pulsed modulated signal (6') in the direction of an object (40);
a receiving device (21), for receiving a pulsed signal (6") reflected by the object (40);
a first signal processor (32; M2, 15), for generating a pulsed demodulated signal (4") from the received signal (6") and the first signal (3); and
a second signal processor (33; M3, 16, 17, 18), for generating a coherent signal (23) from the pulsed demodulated signal (4") and the second signal (4) and for generating a noncoherent signal (22) from the pulsed demodulated signal (4").

19. The apparatus of claim 18,
characterized in that
the signal generator (31; 1, 2, M1, 7, 8) has a first oscillator (1) for generating the first signal (3), a second oscillator (2) for generating the second signal (4), and a first modulator (M1) for modulating the two signals (3, 4) to form a modulated signal pair (5).

20. The apparatus of claim 19,
characterized in that
the signal generator (31; 1, 2, M1, 7, 8) has a filter device (7), in particular a high-pass filter, for converting the modulated signal pair (5) into a filtered modulated signal (6) and a first switch device (8), for converting the filtered modulated signal (6) into a pulsed modulated signal (6').

21. The apparatus of claim 18,
characterized in that
the first signal processor (32; M2, 15) has a second modulator (M2), for converting the received signal (6") with the first signal (3) into a demodulated signal (4'), and a second switch device (15), for converting the demodulated signal (4') into a pulsed demodulated signal (4").

22. The apparatus of claim 18,
characterized in that
the second signal processor (33; M3, 16, 17, 18) has a rectifier (17) and a filter device (18), in particular a low-pass filter, for converting the pulsed demodulated signal (4") into the noncoherent signal (22).

23. The apparatus of claim 18,
characterized in that
the second signal processor (33; M3, 16, 17, 18) has a third modulator (M3) for demodulating the pulsed demodulated signal (4") with the second signal (4) into a twice-demodulated pulsed signal (4'").

24. The apparatus of claim 23,
characterized in that
the second signal processor (33; M3, 16, 17, 18) has an integrator (16) for integrating the pulsed, twice-demodulated signal (4'") into the coherent signal (23).

25. The apparatus of claim 18,
characterized in that
the apparatus has a pulse generator (30; 10, 11, 12, 13), for generating pulse signals (34, 35) for activating the switch devices (8, 15).

26. The apparatus of claim 25,
characterized in that
the pulse generator (30; 10, 11, 12, 13) has a multiplexer (11) and pulse shapers (12, 13) for generating a clock signal (9, 10) that is slightly shifted externally and internally in alternation by a fixed mean value of a period length, for activating the switch devices (15, 8).

27. The apparatus of claim 18,
characterized in that
the modulators (M1, M2, M3) are mixers, and the first modulator (M1), in particular having one diode, is unbalanced, and the second and third modulators (M2, M3) are singly balanced.

28. The apparatus of claim 18,
characterized in that
the third modulator (M3) has an integrated Gilbert cell mixer.

29. The apparatus of claim 18,
characterized in that
an amplifier (14'), in particular a low-frequency preamplifier, for raising the signal level is provided between the second modulator (M2) and the second switch device (15).

* * * * *